(12) United States Patent
Egedal et al.

(10) Patent No.: US 8,105,029 B2
(45) Date of Patent: Jan. 31, 2012

(54) METHOD AND APPARATUS FOR PREDICTION-BASED WIND TURBINE CONTROL

(75) Inventors: Per Egedal, Herning (DK); Rune Rubak, Silkeborg (DK); Henrik Stiesdal, Odense (DK)

(73) Assignee: Siemens Aktiengesellschaft, Munich (DE)

( * ) Notice: Subject to any disclaimer, the term of this patent is extended or adjusted under 35 U.S.C. 154(b) by 469 days.

(21) Appl. No.: 12/386,076

(22) Filed: Apr. 14, 2009

(65) Prior Publication Data

US 2009/0257873 A1 Oct. 15, 2009

(30) Foreign Application Priority Data

Apr. 15, 2008 (EP) .................................... 08007394

(51) Int. Cl.
*F01D 7/00* (2006.01)
*B63H 3/00* (2006.01)
*B64C 11/00* (2006.01)
*B64C 27/00* (2006.01)
*F03B 7/00* (2006.01)

(52) U.S. Cl. ........................................................ 416/33
(58) Field of Classification Search ................... 416/33, 416/31, 41, 44, 25
See application file for complete search history.

(56) References Cited

U.S. PATENT DOCUMENTS

| 6,361,275 B1 | 3/2002 | Wobben |
| 2006/0145483 A1 | 7/2006 | Larsen et al. |

FOREIGN PATENT DOCUMENTS

WO WO 01/33075 A1 5/2001

*Primary Examiner* — Jenny L Wagner

(57) ABSTRACT

A method an apparatus of automatically controlling a wind turbine re provided. of: A time-series of measurement values of the aerodynamic flow property of the wind turbine rotor blade is determined; a predictive wind field model representing a structure of a wind field acting on the wind turbine rotor blade is generated based on the time-series of measurement values, and a control value is generated based on the wind-field model.

20 Claims, 3 Drawing Sheets

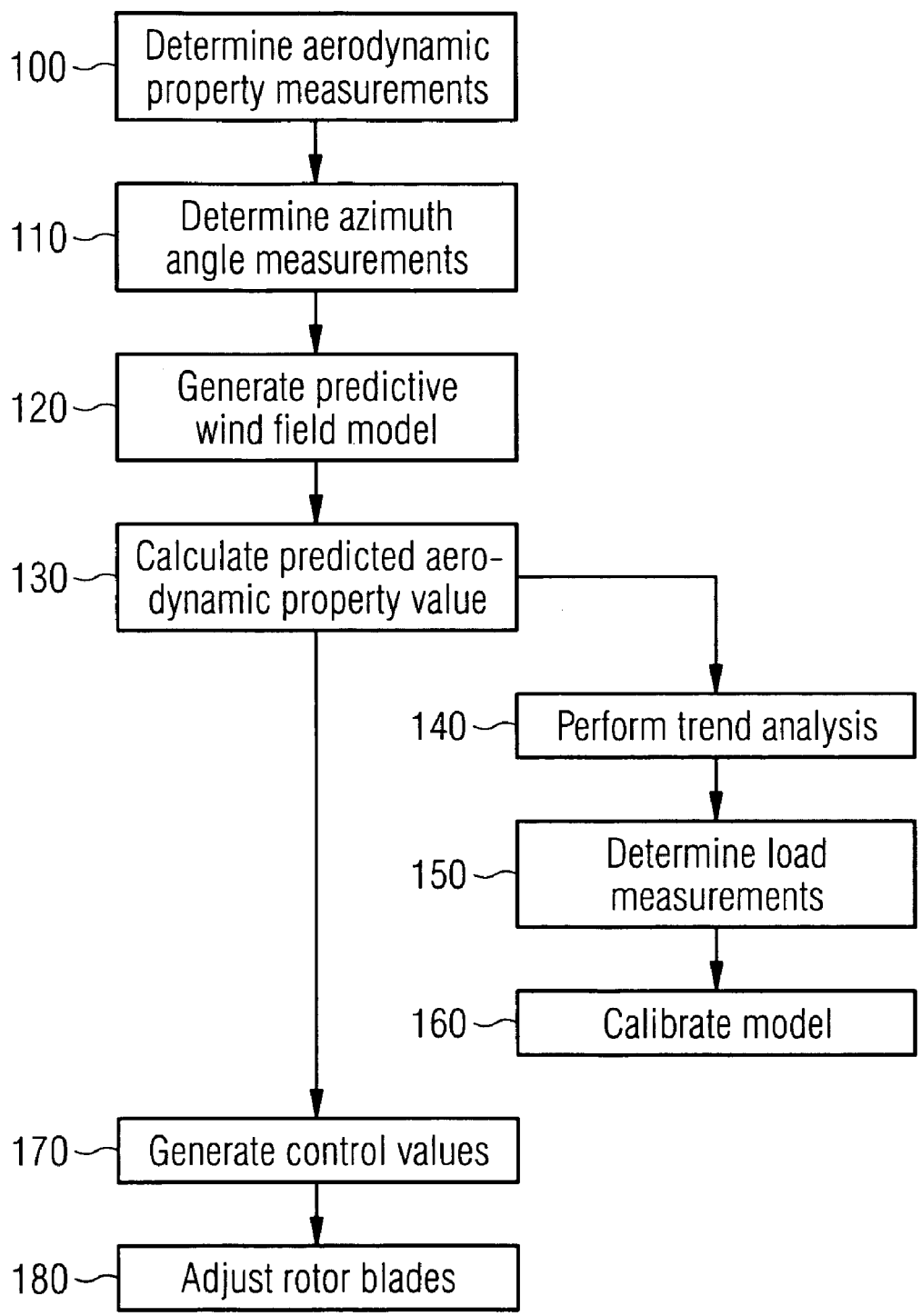

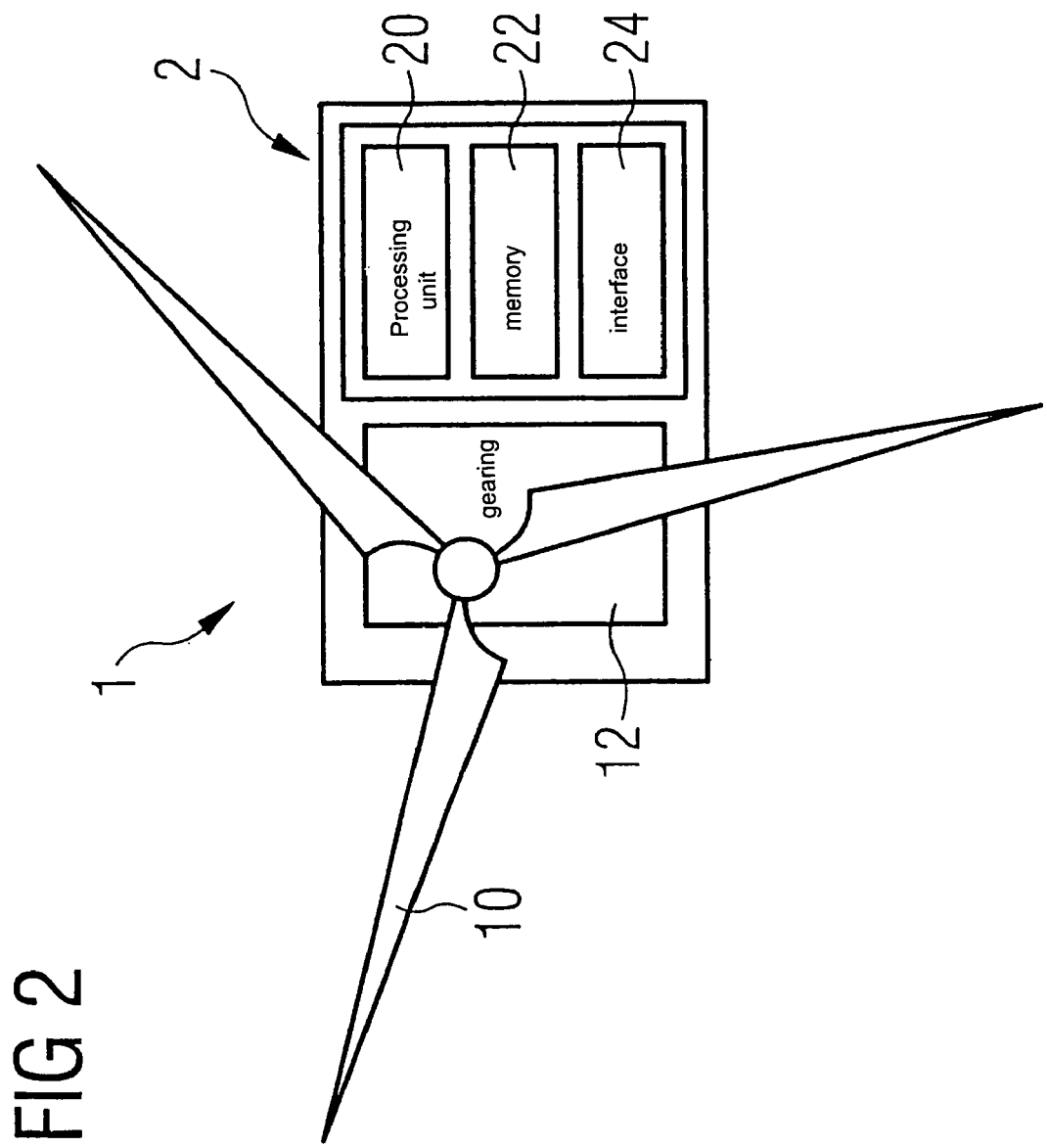

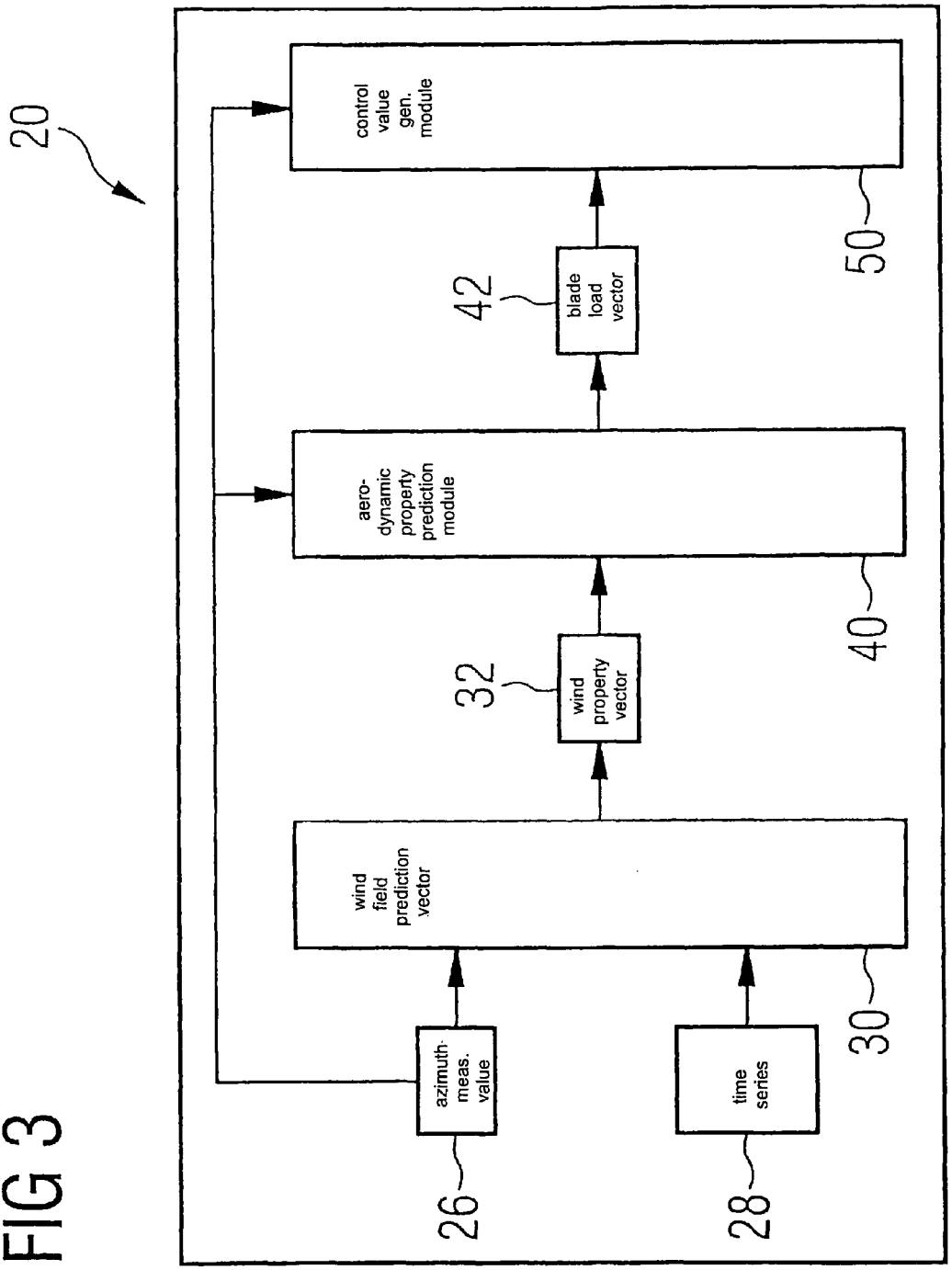

METHOD AND APPARATUS FOR PREDICTION-BASED WIND TURBINE CONTROL

CROSS REFERENCE TO RELATED APPLICATIONS

This application claims priority of European Patent Office application No. 08007394.3 EP filed Apr. 15, 2008, which is incorporated by reference herein in its entirety.

FIELD OF INVENTION

This invention relates to a method of automatically controlling a wind turbine, comprising the steps of determining a measurement value of an aerodynamic flow property of a wind turbine rotor blade, generating a control value, based on the measurement value, to produce a desired operational condition of the wind turbine rotor blade, and adjusting the rotor blade according to the control value.

BACKGROUND OF INVENTION

In order to reduce the weight and cost of major components of wind turbines, wind turbine control systems of the state of the art actively adjust the rotor blades so that the dynamic loads on the wind turbine are minimized while power generation is optimized.

SUMMARY OF INVENTION

International patent application publication WO 01/33075 A1 discloses a method of controlling the operation of a wind turbine wherein the pitch angles of the individual rotor blades are adjusted based on measurements of mechanical loads on the turbine. Thereby, non-uniform wind loads are compensated. However, due to the aerodynamic damping of the blades, mechanical loads are measured with a certain amount of delay after the actual wind disturbance has occurred.

U.S. Pat. No. 6,361,275 B1 discloses a wind turbine that uses individual pitch adjustment for active load reduction based on measuring loads on the blades and the hub. Here, load measurement is implemented using strain gauges. Further, aerodynamic flow properties are measured to complement the load measurements.

United States patent application publication US 2006/0145483 A1 discloses a method wherein air flow properties are measured locally at the individual blades or in front of the blades, and wherein the control process is immediately based on these measurements. This system thus enables to observe the load-inducing factors at, or close to, the point of time at which these factors occur, rather than at a later point of time where these factors have transformed into actual structural load. In the system, however, the control process and its adjustments still depend on the evaluation of the current measurements, so that evaluation and subsequent calculations may induce a certain amount of delay between an occurring air flow impact and corresponding adjustment.

It thus is an object of the invention to provide a wind turbine control method and apparatus that overcomes the disadvantages of the prior art as discussed above, and, in particular, reduces the delay time between an air flow impact upon the wind turbine and a corresponding blade adjustment to a minimum.

This object is achieved by the subject-matter of any one of the independent claims.

The invention proposes a method of automatically controlling a wind turbine, comprising the steps of Determining a measurement value of an aerodynamic flow property of a wind turbine rotor blade;

Generating a control value, based on the measurement value, to produce a desired operational condition of the wind turbine rotor blade;

Adjusting the rotor blade according to the control value, characterized in that:

a time-series of measurement values of the aerodynamic flow property of the wind turbine rotor blade is determined;

a predictive wind field model representing a structure of a wind field acting on the wind turbine rotor blade is generated based on the time-series of measurement values;

the control value is generated based on the wind-field model.

By generating a predictive wind field model based on a time-series of measurements, the present invention enables to calculate an estimation (that is, a forecast) of the air flow behaviour that is immediately upcoming.

By calculating the control values for blade adjustment based on this predictive wind field model rather than on the actual measurements, the resulting adjustments can be made at the same point of time than the actual occurrence of the air flow behaviour, since the delay time resulting from the steps of calculation can be compensated by the space of time provided through the forecasting horizon. By thus providing control adjustments based on the estimated future aerodynamic flow properties, additional delay times resulting from actuators or hydraulics system can be compensated as well.

The invention can be embodied as provided in the dependent claims and/or as given in the detailed embodiment.

In an embodiment, an azimuth measurement value of the wind turbine rotor blade is determined. Here, the predictive wind field model can be generated based on the determined azimuth measurement value.

Further, in embodiments a statistical trend analysis can be performed based on the time-series of measurement values. This can be used for generating of the predictive wind field model, in that the generating is calibrated based on the trend analysis. Further, the generating of the predictive wind field model can be embodied to comprise machine learning based on the trend analysis.

In embodiments, a plurality of measurement values of an aerodynamic flow property can be determined, each measurement value being representative of one of a plurality of rotor blades. Consequently, in such embodiments the predictive wind field model can be based on the plurality of measurement values, and/or a control value can be generated for each rotor blade and each rotor blade be adjusted to its corresponding control value.

Embodiments can further be characterized in that a load measurement value is determined and that the generating of the predictive wind field model is calibrated based on the load measurement value.

In embodiments, the desired operational condition of the wind turbine rotor blade may comprise the blade thrust and/or the blade load.

The invention provides a wind turbine control apparatus for carrying out the method as provided herein, comprising a processing unit and a memory, characterized in that the memory comprises a time-series of measurement values of an aerodynamic flow property of a wind turbine rotor blade;

the processing unit comprises a wind field prediction module configured to generate, based on the time-series of measurement values, a predictive wind field model representing a structure of a wind field acting on the wind turbine rotor blade;

the processing unit comprises a control value generating module configured to generate a control value based on the wind-field model.

The invention can be embodied as provided in the dependent claims and/or as given in the detailed embodiment. Further, the wind turbine control apparatus can be embodied by appropriately configuring the processing unit and its modules comprised therein to implement the method features of the present invention, as further described in the detailed example or the dependent claims.

For example, the wind turbine control apparatus can be implemented so that the control value generating module is configured to perform blade thrust and/or blade load control.

Further, embodiments can be characterized in that the memory comprises a rotor blade azimuth measurement value and the wind field prediction module is configured to generate the predictive wind field model based on the azimuth measurement value.

In embodiments, the wind field prediction module can further be configured to self-calibrate based on the time-series of measurement values. At the same time, or alternatively, the memory may also comprise a load measurement value and the wind field prediction module can be configured to self-calibrate based on the load measurement value.

BRIEF DESCRIPTION OF THE DRAWINGS

The invention will be described in more detail below, referring to the following figures:

FIG. 1 shows a schematic overview of an embodiment of the wind turbine control method;

FIG. 2 shows a schematic overview of an embodiment for a wind turbine control apparatus, executing the method of FIG. 1, and FIG. 3 shows the processing unit of the apparatus of FIG. 2 in more detail.

DETAILED DESCRIPTION OF INVENTION

FIG. 1 shows a schematic overview of an embodiment of the wind turbine control method.

The method will be described while referring to a control apparatus of a wind turbine and a wind turbine which will be described later in more detail.

In step 100, the processing unit of the control apparatus carrying out the present embodiment of the method determines one or more selected aerodynamic property measurements for each of the rotor blades. This is done by selecting the corresponding measurement values from a memory, such as a FIFO memory pipe. In that manner, a time-series of measurements for each blade is obtained.

In step 110, the processing unit further determines the azimuth angles of the rotor blades. The measurement values regarding both the selected aerodynamic properties and the blade azimuth are provided by the processing unit to the wind-field prediction module comprised in the processing unit.

In step 120, the wind-field prediction module generates a predictive wind-field model. For model generation, the prediction module can be appropriately calibrated, as will be described later, and can also be equipped with machine-learning functionality.

The wind field structure can be described as follows:

$$u(\vec{x}, t) = \sum_{j=1}^{n_d} a_j(t)\phi_j(\vec{x}) \qquad (1)$$

wherein the $a_j$ are taken as states of the disturbance system and are assumed piecewise random constant, and $\phi_j(\vec{x})$ are the longitudinal wind speed disturbance basis functions.

The 1p basis functions can be represented as $$r/D \cdot v_H(\cos(\psi), \sin(-\psi)) \qquad (2)$$

and the 2p basis functions as $$r/D \cdot v_H(\cos(2\psi), \sin(2\psi)) \qquad (3)$$

wherein r is the radial position of the point, D is the rotor diameter, $v_H$ is the nominal hub-height wind speed (unperturbed by the uniform disturbance mode), and $\psi$ is the azimuth of the point in the rotor plane, measured clockwise from vertical up, looking downwind. Thus, all relevant parameters can be immediately derived from the wind turbine geometry and/or location of sensors, or can be measured in a straightforward manner. Below, the wind shears are referred to as vertical linear shear, horizontal linear shear, horizontal-axis 2p shear, and cross-axis 2p shear, respectively.

In step 130, the aerodynamic property prediction module comprised in the processing unit calculates the predicted aerodynamic property value. This is an estimated value matching, or being close to, the actual aerodynamic property value that is about to occur at the point of time in the future that corresponds to the forecast-horizon provided by the wind-field model prognosis.

Subsequent steps 170 and 180 can be executed in parallel to calibration steps 140 to 160.

In step 170, the control value generating module comprised in the processing unit generates a control value based on the predicted aerodynamic property value for each of the blades. Accordingly, the wind turbine actor system comprised in the wind turbine adjusts each blade accordingly in step 180. This can be implemented by proper setting of the blade pitch, as well as setting flap positions, or vortex generators.

In step 140, the processing unit performs a trend analysis by accessing aerodynamic property measurements stored in the memory. While, for the purposes of model generation in step 120, a short-term history of measurement values is accessed, performing the trend analysis requires a long-term history of measurement values. The statistical trend analysis can be implemented by statistical methods, or by methods of self-adaptive machine learning, such as unsupervised neural networks. In the latter case, model calibration (step 160) and statistical analysis can be performed in the same process.

In addition or alternatively, measurement values for structural loads can be determined, for instance by strain gauges, for instance located at the blades, or by accelerometers, for instance located in the nacelle. These measurements can be correlated to the aerodynamic property measurements regarding their time of occurence. Thus, when the generating process in the wind-field prediction model is calibrated by the processing unit in step 160, these load measurements can be used for calibrating the model as well, for both calibrating the prediction behaviour and, particularly, for calibrating the structural response as a result of the predicted flow.

FIG. 2 shows a schematic overview of an embodiment for a wind turbine control apparatus, executing the method of FIG. 1.

Wind turbine 1 comprises a rotor 10 with three rotor blades. The rotor is coupled to the wind turbine over a gearing 12. The wind turbine also comprises an acceleration sensor for measuring structural load on the wind turbine.

Wind turbine 1 further comprises wind turbine control apparatus 2, which is configured to carry out the method presented herein. For this, control apparatus 2 comprises a processing unit 20, a memory 22, and a communication interface 24, which serves to acquire measurement values from external sensors or additional control equipment, and further serves to communicate generated control values to actors comprised in the wind turbine, to adjust blade pitch, flap positions, etc. Processing unit 20, memory 22, and communication interface 24 are connected to each other via a bus or a network in order to exchange data. In alternative implementations, processing unit, memory and communication interface are coupled over data communication means and are not necessarily physically comprised within a device housing.

Processing unit 20 can be implemented using universal purpose or application specific computing hardware, such as universal central processing units (CPUs) or application-specific integrated circuits (ASICs) which both may be combined with appropriate software to configure the functions of the method.

FIG. 3 shows the processing unit of the apparatus of FIG. 2 in more detail.

Processing unit 20 of the wind turbine control apparatus comprises a wind-field prediction module 30, a aerodynamic property prediction module 40, and a control value generating module 50, each of which can be implemented as a functional encapsulation in a software program, or as a electronic component.

As described above with reference to FIG. 3, the wind-field prediction module 30 is configured to generate a predictive wind-field model. For doing so, it obtains a time-series 28 of aerodynamic property values for each blade of the wind turbine as well as an azimuth measurement value 26. Then, it calculates the estimated or forecasted wind field properties according to the generated model, in a wind property vector 32. This vector 32 comprises values for vertical and horizontal linear shear, for horizontal-axis and cross-axis 2p shear, and for the mean wind.

In embodiments wherein wind turbine control comprises blade load control, aerodynamic property prediction module 40 is implemented as blade load prediction module, and consequently calculates a blade load vector 42, also in general called predicted aerodynamic property values 42, comprising an estimated future blade load value for each of the blades, based on the wind property vector 32 and azimuth measurement value 26.

In such an implementation, control value generating module 50 is implemented as a blade load control module which calculates a blade load control value for each of the blades based on the blade load vector 42 and azimuth measurement value 26. The individual control values can be further combined with additional reference control signals or other control signals, and then used for adjusting the blade pitches accordingly. As an example a common pitch reference value (not shown) may be added to the blade control output value for adjusting the pitch of each blade accordingly.

In embodiments wherein wind turbine control comprises blade thrust control, aerodynamic property prediction module 40 is implemented as blade thrust prediction module, and consequently calculates a blade thrust vector 42 comprising an estimated future blade thrust value for each of the blades, based on the wind property vector 32 and azimuth measurement value 26.

In such an implementation, control value generating module 50 is implemented as a blade thrust control module which calculates a blade thrust control value for each of the blades based on the blade thrust vector 42 and azimuth measurement value 26. Also in this case, the individual control values can be further combined with additional reference control signals or other control signals, and then used for adjusting the blade pitches accordingly.

Implementations with both blade thrust and blade load control can be implemented by incorporating the corresponding modules as described above to a single processing unit, or by incorporating the functionalities of both prediction modules 40 and control modules 50 in one single prediction module and control module, respectively.

Thus, a wind turbine control system is provided that is able to minimize variations in blade thrust forces and/or blade loads and which can be combined with P, PI, PD, and/or PID control methods, may implement Model Predictive Control (MPC), and Least Quadratic Control and/or Constrained Least Quadratic Control.

The present wind turbine control system improves the overall stability of the controlled wind turbine while reducing fatigue loads, avoiding extreme temporary loads during operation and reducing the risk of blade-tower interaction. It further provides for proper adjustment of the rotor blades of the controlled wind-turbine while eliminating practically all delays due to control calculations.

The invention claimed is:

1. A method of automatically controlling a wind turbine, comprising:
   determining a time-series of measurement values of an aerodynamic flow property of a wind turbine rotor blade;
   generating a predictive wind field model representing a structure of a wind field acting on the wind turbine rotor blade based on the time-series of measurement values;
   generating, based on the wind-field model, a control value to produce a desired operational condition of the wind turbine rotor blade; and
   adjusting the wind turbine rotor blade according to the control value.

2. The method according to claim 1, further comprising:
   determining an azimuth measurement value of the wind turbine rotor blade.

3. The method according to claim 2, wherein the predictive wind field model is further based on the determined azimuth measurement value.

4. The method according to claim 1, further comprising:
   performing a statistical trend analysis based on the time-series of measurement values.

5. The method according to claim 4, further comprising:
   calibrating the generating of the predictive wind field model based on the statistical trend analysis.

6. The method according to claim 4, wherein the generating of the predictive wind field model comprises machine learning based on the statistical trend analysis.

7. The method according to claim 5, further comprising:
   determining a load measurement value, and
   wherein the calibrating the generating of the predictive wind field model is based on the load measurement value.

8. The method according to claim 1, wherein the desired operational condition of the wind turbine rotor blade comprises a blade thrust.

9. The method according to claim 1, wherein the desired operational condition of the wind turbine rotor blade comprises the blade load.

10. The method according to claim 1, wherein the wind turbine rotor blade is adjusted cyclically.

11. A wind turbine control apparatus, comprising
a memory that comprises a time-series of measurement values of an aerodynamic flow property of, or in the vicinity of, a wind turbine rotor blade; and
a processing unit that comprises:
a wind field prediction module generates, based on the time-series of measurement values, a predictive wind field model representing a structure of a wind field acting on the wind turbine rotor blade, and
a control value generating module generates a control value based on the wind-field model,
wherein the wind turbine rotor blade is adjusted according to the control value.

12. The wind turbine control apparatus according to claim 11, wherein the processing unit further comprises an aerodynamic property prediction module with an input from at least the wind field prediction module and an output to the control value generating module.

13. The wind turbine control apparatus according to claim 12,
wherein the input from the wind field prediction module is a vector of predicted wind field properties comprising forecasted values for vertical and/or horizontal linear shear and/or for horizontal-axis and/or cross-axis 2p-shear and/or for the mean wind, and
wherein the output to the control value generating module is a vector of a predicted aerodynamic property value the wind turbine rotor blade.

14. The wind turbine control apparatus according to claim 13, wherein that the vector of the predicted aerodynamic property value comprises a blade load value and/or a blade thrust value.

15. The wind turbine control apparatus according to claim 14, wherein the control value generating module performs a blade thrust control.

16. The wind turbine control apparatus according to claim 14, wherein the control value generating module performs blade load control.

17. The wind turbine control apparatus according to claim 13,
wherein the memory further comprises a rotor blade azimuth measurement value, and
wherein the predictive wind field model is further based on the determined azimuth measurement value.

18. The wind turbine control apparatus according to claim 13, wherein the wind field prediction module self-calibrates on the time-series of measurement values.

19. The wind turbine control apparatus according to claim 13,
wherein the memory comprises a load measurement value, and
wherein the wind field prediction module to self-calibrates based on the load measurement value.

20. The wind turbine control apparatus according to claim 11, wherein the memory further comprises a reference control signal which is a pitch angle reference control signal which is added to an output of the control value generating module.

* * * * *